(12) United States Patent
Naboulsi

(10) Patent No.: US 10,061,018 B1
(45) Date of Patent: Aug. 28, 2018

(54) SYSTEM FOR IDENTIFYING DRONES

(71) Applicant: Zain Naboulsi, Katy, TX (US)

(72) Inventor: Zain Naboulsi, Katy, TX (US)

(*) Notice: Subject to any disclaimer, the term of this patent is extended or adjusted under 35 U.S.C. 154(b) by 327 days.

(21) Appl. No.: 15/048,911

(22) Filed: Feb. 19, 2016

Related U.S. Application Data

(60) Provisional application No. 62/118,422, filed on Feb. 19, 2015.

(51) Int. Cl.
*G01S 7/41* (2006.01)
*G01S 13/02* (2006.01)
*G01S 13/86* (2006.01)

(52) U.S. Cl.
CPC ............. *G01S 7/41* (2013.01); *G01S 13/02* (2013.01); *G01S 13/865* (2013.01); *G01S 13/867* (2013.01)

(58) Field of Classification Search
CPC ......... G01S 13/78–13/788; G01S 7/41; G01S 7/411; G01S 7/412; G01S 7/414; G01S 7/415; G01S 13/00; G01S 13/02; G01S 13/04; G01S 13/06; G01S 13/42; G01S 13/50; G01S 13/56; G01S 13/58; G01S 13/91; G01S 13/93; G01S 13/9303
See application file for complete search history.

(56) References Cited

U.S. PATENT DOCUMENTS

| | | | | |
|---|---|---|---|---|
| 4,710,774 A * | 12/1987 | Gunny | ................ | G01S 13/9303 342/29 |
| 5,093,663 A * | 3/1992 | Baechtiger | ............. | G01S 7/006 342/201 |
| 6,400,647 B1 * | 6/2002 | Huntress | ................ | G01V 1/001 367/136 |
| 6,653,971 B1 * | 11/2003 | Guice | ................... | A01M 1/026 342/22 |
| 7,109,916 B2 * | 9/2006 | Klinnert | ................ | G01S 13/003 342/134 |
| 7,706,979 B1 * | 4/2010 | Herwitz | ................ | G01S 13/003 340/903 |
| 7,737,878 B2 * | 6/2010 | van Tooren | ......... | G01S 13/9303 244/3.1 |
| 8,446,321 B2 * | 5/2013 | Smith | ................... | G01S 5/0081 342/457 |
| 9,310,477 B1 * | 4/2016 | Sampigethaya | ........ | G01S 13/91 |
| 2002/0130807 A1 * | 9/2002 | Hall | ........................ | G01S 7/282 342/28 |
| 2005/0004759 A1 * | 1/2005 | Siegel | ..................... | G01S 13/66 701/519 |

(Continued)

*Primary Examiner* — Peter M Bythrow
(74) *Attorney, Agent, or Firm* — Plager Schack LLP; Mark H. Plager

(57) ABSTRACT

A system for identifying a drone is adapted to determine a base threat value for a drone. The system includes a scanning system, configured to obtain data that is stored in a pattern database. A timer that has a data structure for storing a counter initialized to a predetermined value, the timer being operable to iteratively increment the counter if the counter value is less than a timer increment. A microprocessor is programmed with instructions to receive information from the scanning system about the drone. Then, to store the information in a pattern database. After that, to determine a base threat value of the drone based on the information stored in the pattern database. Finally, to communicate the base threat value to a user so that the user can determine whether the drone is a friend or a foe.

10 Claims, 3 Drawing Sheets

(56) References Cited

U.S. PATENT DOCUMENTS

| | | | |
|---|---|---|---|
| 2005/0068517 A1* | 3/2005 | Evans | G01S 7/481 356/5.01 |
| 2005/0119828 A1* | 6/2005 | Lahn | G01S 5/0009 701/514 |
| 2006/0164261 A1* | 7/2006 | Stiffler | G01C 23/00 340/945 |
| 2007/0024494 A1* | 2/2007 | Dizaji | G01S 7/412 342/90 |
| 2007/0078600 A1* | 4/2007 | Fregene | G01S 13/9303 701/301 |
| 2007/0210953 A1* | 9/2007 | Abraham | G08G 5/0069 342/29 |
| 2007/0222665 A1* | 9/2007 | Koeneman | G01S 13/9303 342/29 |
| 2008/0027647 A1* | 1/2008 | Ansell | G01S 13/723 701/301 |
| 2008/0030404 A1* | 2/2008 | Irwin | H01Q 1/276 342/372 |
| 2008/0088508 A1* | 4/2008 | Smith | G01S 5/06 342/453 |
| 2008/0243383 A1* | 10/2008 | Lin | G01C 21/165 701/469 |
| 2009/0135046 A1* | 5/2009 | Steele | G01S 7/414 342/27 |
| 2009/0140922 A1* | 6/2009 | Maintoux | G01S 7/2813 342/379 |
| 2009/0223354 A1* | 9/2009 | Root, Jr. | G01S 7/22 89/1.11 |
| 2009/0243911 A1* | 10/2009 | Cornic | G01S 7/40 342/36 |
| 2010/0042269 A1* | 2/2010 | Kokkeby | G01S 3/7864 701/3 |
| 2010/0085236 A1* | 4/2010 | Franceschini | G01S 13/765 342/30 |
| 2010/0121574 A1* | 5/2010 | Ariyur | G05D 1/101 701/301 |
| 2010/0283661 A1* | 11/2010 | Strain | G01S 5/0072 342/30 |
| 2010/0315281 A1* | 12/2010 | Askelson | G01S 7/003 342/30 |
| 2011/0140952 A1* | 6/2011 | Kemkemian | G01S 13/426 342/146 |
| 2011/0169684 A1* | 7/2011 | Margolin | G01S 5/12 342/30 |
| 2011/0221625 A1* | 9/2011 | Cornic | G01S 13/424 342/29 |
| 2012/0092208 A1* | 4/2012 | LeMire | G01S 13/87 342/29 |
| 2015/0063575 A1* | 3/2015 | Tan | G06F 17/30743 381/56 |
| 2015/0123840 A1* | 5/2015 | Morita | G01S 7/02 342/175 |
| 2015/0237569 A1* | 8/2015 | Jalali | H04W 84/06 370/326 |
| 2015/0302858 A1* | 10/2015 | Hearing | G10L 19/00 381/58 |
| 2015/0331099 A1* | 11/2015 | Wu | G01S 13/876 342/32 |
| 2016/0025849 A1* | 1/2016 | Wang | G01S 7/023 342/59 |
| 2017/0148467 A1* | 5/2017 | Franklin | G10L 25/51 |
| 2017/0223712 A1* | 8/2017 | Stephens | H04W 72/0473 |

* cited by examiner

SYSTEM FOR IDENTIFYING DRONES

RELATED APPLICATION

This application claims priority to provisional patent application U.S. Ser. 62/118,422 filed on Feb. 19, 2015, the entire contents of which is herein incorporated by reference.

BACKGROUND

The embodiments herein relate generally to systems for identifying whether a drone is a friend or a foe. Prior to embodiments of the disclosed invention, IFF systems used a two-channel system, with one frequency (1030 megahertz) used for the interrogating signals and another (1090 megahertz) for the reply. However, this system has not kept up with the proliferation of drone technology in the United States. Recreational and industrial drones were becoming prolific. While most of these drones are used for legitimate purposes, some were not. For example, drones were being used to spy on celebrities, industrial espionage, transporting weapons to inmates, and many other nefarious purposes. Embodiments of the disclosed invention solve this problem.

SUMMARY

A system for identifying a drone is adapted to determine a base threat value for a drone. The system includes a scanning system, configured to obtain data that is stored in a pattern database. A timer that has a data structure for storing a counter initialized to a predetermined value, the timer being operable to iteratively increment the counter if the counter value is less than a timer increment. A microprocessor is programmed with instructions to receive information from the scanning system about the drone. Then, to store the information in a pattern database. After that, to determine a base threat value of the drone based on the information stored in the pattern database. Finally, to communicate the base threat value to a user so that the user can determine whether the drone is a friend or a foe.

In some embodiments, a threat entry log can be communicatively coupled to the microprocessor. The scanning system further comprises a radio frequency detection system that searches for a radio frequency that is within a radio frequency threat entry range. The radio frequency can be recorded in the threat entry log for the drone.

In some embodiments, the scanning system further comprises a video and thermal imaging detection system that searches for a video and thermal image that is within an image frequency threat entry range. The video and thermal image is recorded in the threat entry log for the drone.

In some embodiments, the scanning system further comprises an active and passive radar detection system that searches for a radar that is within a radar frequency threat entry range. The radar is recorded in the threat entry log for the drone.

In some embodiments, the scanning system further comprises a lidar detection system that searches for lidar that is within a lidar threat entry range. The lidar can be recorded in the lidar entry log for the drone.

In some embodiments, the scanning system further comprises an audio detection system that searches for an audio signal that is within an audio frequency threat entry range. The audio signal can be recorded in the threat entry log for the drone.

In some embodiments, the microprocessor can be further programmed to receive identifying information from a transponder on the drone and use the identifying information to update the base threat level of the drone. In some embodiments, the microprocessor can be further programmed to determine positioning information from the drone and use the positioning information to update the base threat level of the drone. In some embodiments, the microprocessor can be further programmed to determine relative motion information from the drone and use the relative motion information to update the base threat level on the drone. In some embodiments, the microprocessor can be further programmed to determine signal strength from the drone and use the signal strength information to update the base threat level on the drone.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
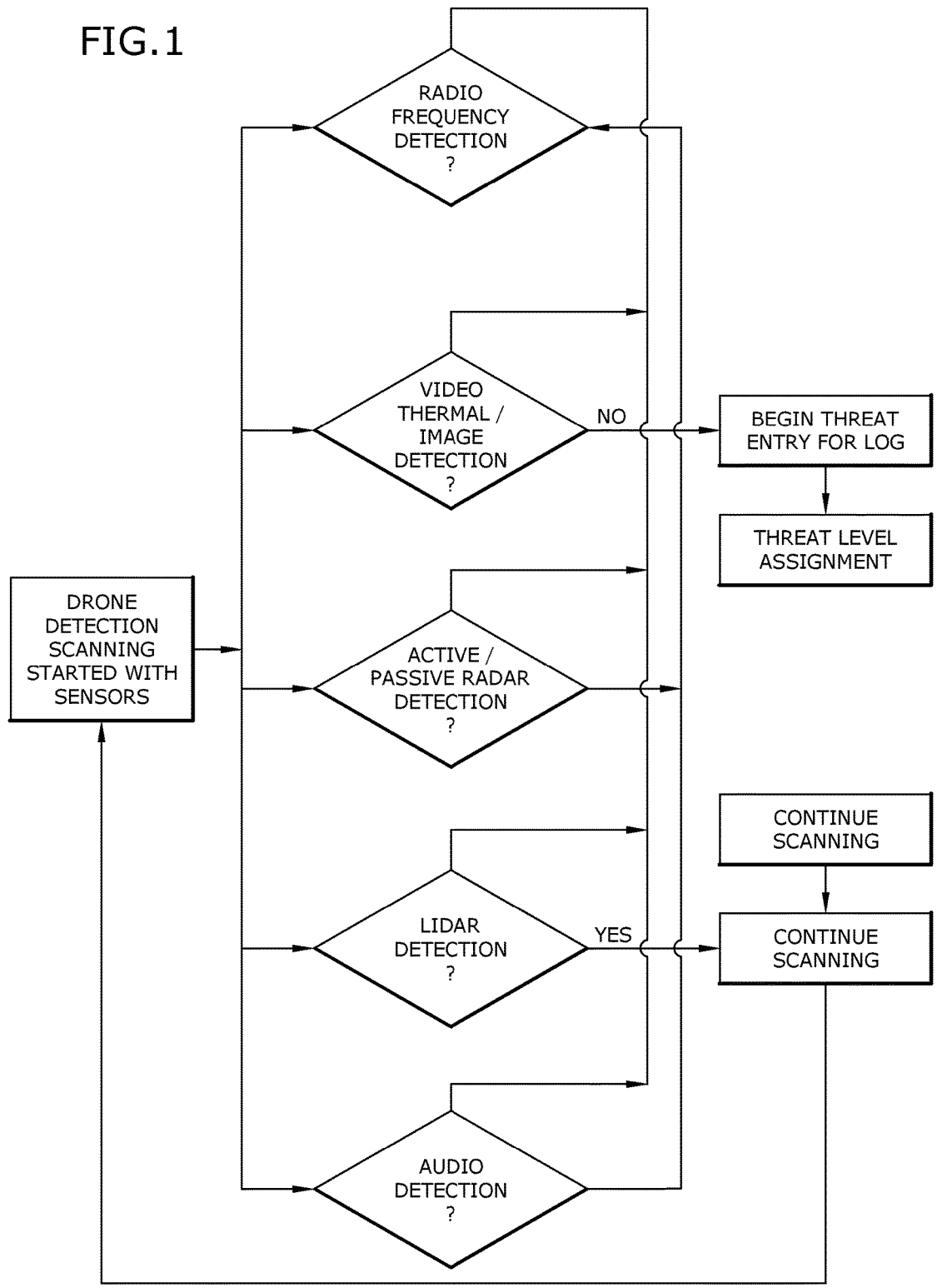
FIG. 1 shows a flow chart of one embodiment of the present invention.

By way of example, and referring to FIG. 1, one embodiment of the system for identifying a drone 10 comprises a scanning system 12. Scanning system 12 further comprises radio frequency detection system 14, video and thermal imaging detection system 16, active and passive radar detection system 18, lidar detection system 20 and audio detection system 22.

While the system is operating during each time interval, radio frequency detection system 14 searches for a radio frequency that is within a radio frequency threat entry range. If so, then that frequency is recorded in threat entry log 24 for the source of the radio frequency.

While the system is operating during each time interval video and thermal imaging detection system 16 searches for a thermal image or a video image that is within an image threat entry range. If so, then that image is recorded in threat entry log 24 for the source of the image.

While the system is operating during each time interval, active and passive radar detection system 18 searches for a radar signal that is within a radar threat entry range. If so, then that radar signal is recorded in threat entry log 24 for the source of the radar.

While the system is operating during each time interval, lidar detection system 20 searches for a lidar signal that is within a lidar threat entry range. If so, then that lidar signal is recorded in threat entry log 24 for the source of the lidar.

While the system is operating during each time interval, audio detection system 24 searches for an audio signal that is within an audio threat entry range. If so, then that audio signal is recorded in threat entry log 24 for the source of the audio.

System for identifying a drone 10 then takes the entries in threat log entry 24 and makes a threat level assessment 26. The process then iterates at step 28 and the next time interval makes a new threat level assessment 26.

Figure 2:
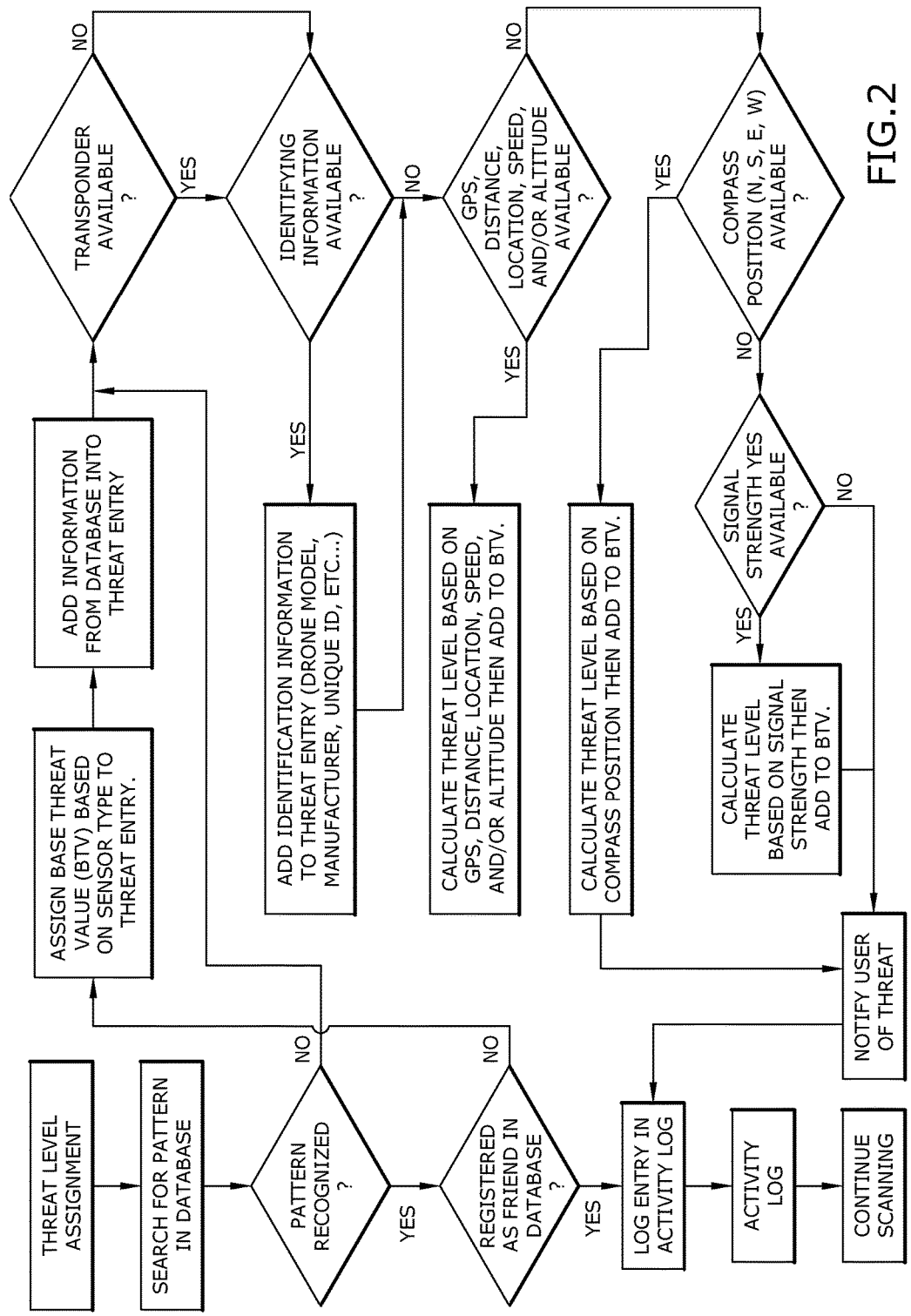
FIG. 2 shows a flow chart of one embodiment of the present invention.
Figure 3:
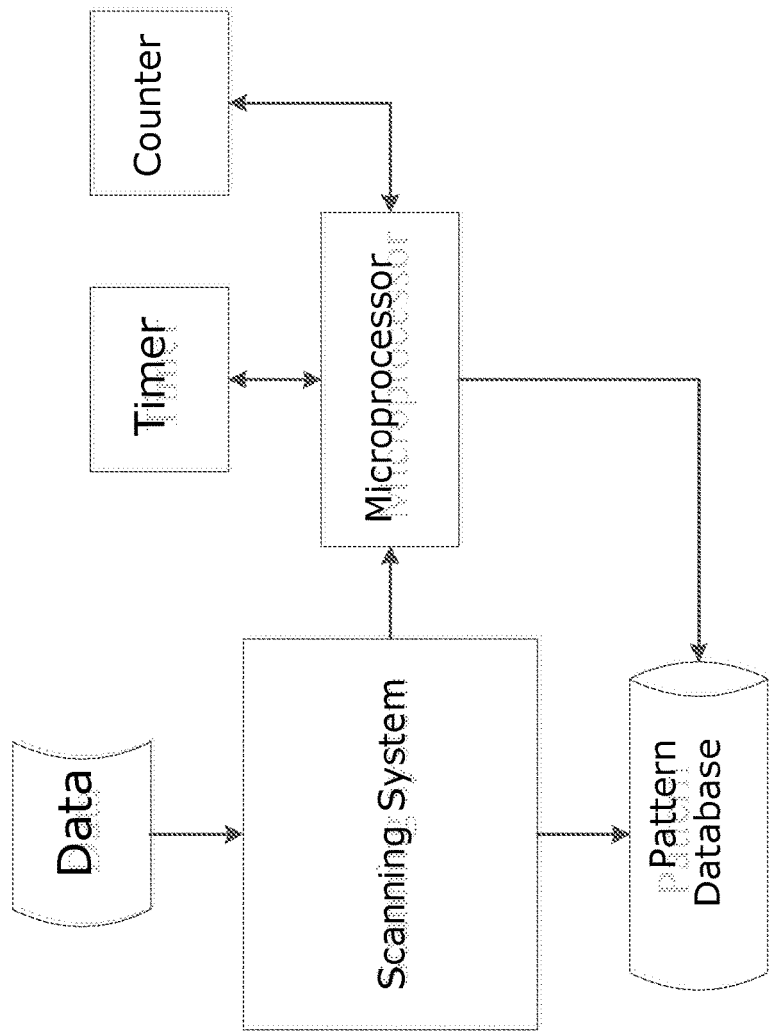
FIG. 3 shows a schematic of one embodiment of the present invention.

Turning to FIG. 2, threat level assignment 26 is recursively updated in the following manner. The threat log entry 24 is compared with entries in pattern database 28. If the pattern is recognized at step 30 and registered as a friend at step 32 then the friend is logged in an activity log 34. From there the process iterates at step 28.

If the pattern is recognized at step 30 and not registered as a friend at step 32, then system for identifying a drone 10 assigns base threat value 36 based on the sensor type used to make the threat entry. Base threat value 36 is then stored into pattern database 28. If pattern is not recognized at step 30, on once the base threat value 36 is then stored into pattern database, system for identifying a drone 10 determines if the drone has a transponder at step 38. If so, system for identifying a drone 10 determines if the drone has identifying information available at step 40.

If identifying information is available at step 40 then that identifying information is added into pattern database 28. Next, system for identifying a drone 10 determines if positioning information is available at step 42. If so that information is added to the base threat value 36.

If positioning information is not available at step 42, then system for identifying a drone 10 determines if relative motion information is available at step 44. If so that information is added to the base threat value 36.

If relative motion information is not available at step 44, then then system for identifying a drone 10 determines if signal strength information is available at step 46. If so that information is added to the base threat value 36.

The base threat value is then communicated to a user at step 48. Following that the base threat value is logged in an activity log 34.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for identifying a drone is adapted to determine a base threat value for a drone; the system comprising:
   a scanning system, wherein the scanning system obtains data that is then stored in a pattern database;
   a timer; the timer having a data structure for storing a counter initialized to a predetermined value, the timer being operable to iteratively increment the counter if the counter value is less than a timer increment;
   a microprocessor, programmed with instructions to:
      receive information from the scanning system about the drone;
      store the information in a pattern database;
      determine a base threat value of the drone based on the information stored in the pattern database
      communicating the base threat value to a user so that the user can determine whether the drone is a friend or a foe; and
   start the counter and perform the following instructions in a loop until the timer increment is reached:
      receiving identifying information from a transponder signal from the drone;
      calculating an updated threat level based on the identifying information
      receiving position information including a distance, a location, a speed, and an altitude from the drone;
      re-calculating the updated threat level based on the position information;
      determining a compass position of the drone;
      re-calculating the updated threat level based on the compass position;
      logging the updated threat level in the pattern database
      increment the timer.

2. The system for identifying a drone of claim 1, further comprising:
   a threat entry log, communicatively coupled to the microprocessor;
   wherein the scanning system further comprises a radio frequency detection system that searches for a radio frequency that is within a radio frequency threat entry range;
   wherein the radio frequency is recorded in the threat entry log for the drone.

3. The system for identifying a drone of claim 2, wherein the scanning system further comprises a video and thermal imaging detection system that searches for a video and thermal image that is within an image frequency threat entry range;
   wherein the video and thermal image is recorded in the threat entry log for the drone.

4. The system for identifying a drone of claim 3, wherein the scanning system further comprises an active and passive radar detection system that searches for a radar that is within a radar frequency threat entry range;
   wherein the radar is recorded in the threat entry log for the drone.

5. The system for identifying a drone of claim 4, wherein the scanning system further comprises a lidar detection system that searches for lidar that is within a lidar threat entry range;
   wherein the lidar is recorded in the lidar entry log for the drone.

6. The system for identifying a drone of claim 5, further comprising:
- wherein the scanning system further comprises an audio detection system that searches for an audio signal that is within an audio frequency threat entry range;
- wherein the audio signal is recorded in the threat entry log for the drone.

7. The system for identifying a drone of claim 1, wherein the microprocessor is further programmed to receive identifying information from a transponder on the drone and use the identifying information to update the base threat level of the drone.

8. The system for identifying a drone of claim 7, wherein the microprocessor is further programmed to determine positioning information from the drone and use the positioning information to update the base threat level of the drone.

9. The system for identifying a drone of claim 8, wherein the microprocessor is further programmed to determine relative motion information from the drone and use the relative motion information to update the base threat level on the drone.

10. The system for identifying a drone of claim 8, wherein the microprocessor is further programmed to determine signal strength from the drone and use the signal strength information to update the base threat level on the drone.

\* \* \* \* \*